United States Patent
Lorenz

(10) Patent No.: US 7,383,144 B2
(45) Date of Patent: Jun. 3, 2008

(54) METHOD AND APPARATUS FOR CALIBRATION OF AN ON-CHIP TEMPERATURE SENSOR WITHIN A MEMORY DEVICE

(75) Inventor: Harald Lorenz, South Burlington, VT (US)

(73) Assignee: Infineon Technologies AG, Neubiberg (DE)

( * ) Notice: Subject to any disclaimer, the term of this patent is extended or adjusted under 35 U.S.C. 154(b) by 198 days.

(21) Appl. No.: 11/354,955

(22) Filed: Feb. 16, 2006

(65) Prior Publication Data

US 2007/0189355 A1   Aug. 16, 2007

(51) Int. Cl.
G01K 13/00 (2006.01)
G01K 15/00 (2006.01)
G06F 19/00 (2006.01)

(52) U.S. Cl. .............. 702/99; 374/1; 702/85; 702/104; 702/107; 702/130

(58) Field of Classification Search .......... 374/1; 702/1, 85, 99, 104, 107, 127, 130
See application file for complete search history.

(56) References Cited

U.S. PATENT DOCUMENTS

| | | | | |
|---|---|---|---|---|
| 4,284,872 A * | 8/1981 | Graeme | ............... | 219/121.69 |
| 4,356,379 A * | 10/1982 | Graeme | ............... | 219/209 |
| 4,840,494 A | 6/1989 | Horn | | |
| 5,361,001 A * | 11/1994 | Stolfa | ............... | 327/530 |
| 5,638,418 A * | 6/1997 | Douglass et al. | ............... | 377/25 |
| 5,838,076 A * | 11/1998 | Zarrabian et al. | ............... | 307/115 |
| 6,055,489 A * | 4/2000 | Beatty et al. | ............... | 702/130 |
| 6,115,441 A * | 9/2000 | Douglass et al. | ............... | 377/25 |
| 6,147,908 A * | 11/2000 | Abugharbieh et al. | ... | 365/185.2 |
| 6,393,577 B1 * | 5/2002 | Akamatsu et al. | ............... | 713/600 |
| 6,472,897 B1 * | 10/2002 | Shyr et al. | ............... | 324/765 |
| 6,484,232 B2 * | 11/2002 | Olarig et al. | ............... | 711/105 |
| 6,501,256 B1 * | 12/2002 | Jaussi et al. | ............... | 323/315 |
| 6,608,472 B1 * | 8/2003 | Kutz et al. | ............... | 323/313 |
| 6,720,800 B2 * | 4/2004 | Shyr et al. | ............... | 327/103 |
| 6,749,335 B2 | 6/2004 | Gauthier et al. | | |
| 6,845,478 B2 * | 1/2005 | Luong | ............... | 714/738 |
| 7,081,842 B2 * | 7/2006 | Cranford, Jr. et al. | ............... | 341/121 |
| 7,272,523 B1 * | 9/2007 | John et al. | ............... | 702/85 |
| 2003/0006747 A1 * | 1/2003 | Jaussi et al. | ............... | 323/315 |
| 2003/0081484 A1 * | 5/2003 | Kobayashi et al. | ............... | 365/222 |
| 2003/0085741 A1 * | 5/2003 | Shyr et al. | ............... | 327/100 |
| 2003/0158683 A1 | 8/2003 | Gauthier et al. | | |
| 2004/0143410 A1 | 7/2004 | Clabes et al. | | |
| 2004/0216019 A1 * | 10/2004 | Shyr et al. | ............... | 714/724 |
| 2005/0197795 A1 | 9/2005 | Aas et al. | | |
| 2007/0189355 A1 * | 8/2007 | Lorenz | ............... | 374/1 |

\* cited by examiner

*Primary Examiner*—Edward R Cosimano
(74) *Attorney, Agent, or Firm*—Edell, Shapiro & Finnan, LLC

(57) ABSTRACT

According to embodiments of the present invention, an automatic trim or calibration for a temperature sensor of a chip or memory device is performed on that chip. An embodiment of the present invention includes a calibration unit that increments trim or calibration values provided to the chip temperature sensor and stored in a calibration register. The calibration unit retrieves status bits from the temperature sensor indicating a measured temperature for each calibration value and compares those bits to a reference or target value associated with a target temperature and stored in a reference register. When the status bits satisfy the comparison, the corresponding calibration value is identified as the proper calibration value for the temperature sensor and is subsequently used by the temperature sensor for temperature measurements.

20 Claims, 6 Drawing Sheets

METHOD AND APPARATUS FOR CALIBRATION OF AN ON-CHIP TEMPERATURE SENSOR WITHIN A MEMORY DEVICE

BACKGROUND OF THE INVENTION

1. Technical Field

The present invention pertains to sensor calibration. In particular, the present invention pertains to an automatic calibration for a temperature sensor of a memory device.

2. Discussion of the Related Art

Memory devices are utilized to store information for various applications. A commonly utilized memory device includes a dynamic random access memory (DRAM). These types of memory devices store information in memory cell arrays that are configured in a matrix of intersecting rows and columns. The rows are commonly referred to as word lines. Each memory cell generally includes a storage capacitor to hold a charge and a transistor to access the charge of the capacitor. The charge may be a high or low voltage potential (referred to as a data bit), thereby providing the memory cell with two logic states. The memory cells of the DRAM must be refreshed periodically due to leakages within the capacitors storing the charges (or bits).

Generally, semi-conductor wafers include a plurality of chips or circuits (e.g., a Dynamic Random Access Memory (DRAM) wafer may include five-hundred chips). An exemplary chip or memory device is illustrated in FIG. 1. Specifically, each chip or memory device 2 (e.g., Dynamic Random Access Memory (DRAM)) includes a memory cell array 4, a temperature sensor 12 and a trim or calibration register 16. The memory cell array stores information or data and is substantially similar to the memory cell array described above. Since memory device operation may vary with temperature, the temperature sensor is utilized to measure the temperature of a corresponding chip. The temperature sensor includes a status register 14 to provide status bits or a code indicating the temperature sensor status in response to a temperature measurement. Trim register 16 stores calibration results for the temperature sensor as described below. The temperature sensor receives a trim or calibration setting from a test unit, and provides status bits or a code in status register 14 to indicate the temperature sensor status in response to a temperature measurement.

Basically, the status bits change states or values in response to the measured temperature in order to provide an indication of that temperature. Referring to FIG. 2, the temperature sensor status bits include states or values one through seven (e.g., '001' to '111' as indicated by the three status bits in FIG. 2) each associated with a corresponding temperature or temperature range. As the temperature increases, the status bits transition from state seven (e.g., status bit values of '111') toward state one (e.g., status bit values of '001') in accordance with the measured temperature. In other words, the status bits indicate the state corresponding to the temperature or temperature range encompassing the measured temperature. By way of example only, a transition of the status bits from state five (e.g., status bit values of '101') to state four (e.g., status bit values of '100') indicates detection of a reference temperature.

The temperature sensor of each chip needs to be calibrated with respect to the reference temperature to ensure uniform temperature measurements. In order to accomplish this calibration, a trim or calibration value is determined for temperature sensor 12 of each chip to enable the temperature sensors to provide status bits switching between the same states in response to detection of the reference temperature. In other words, each temperature sensor needs to provide status bits transitioning between the same states (e.g., between states five and four as viewed in FIG. 2) in response to detection of the reference temperature. The trim or calibration value achieving this result typically varies for each temperature sensor due to manufacturing or hardware fluctuations among the temperature sensors.

Currently, temperature sensor trimming or calibration is performed for a reference temperature of approximately 88° C. In particular, the ambient environment for each temperature sensor is set to approximately 88° C. Temperature sensors of several chips (e.g., on a wafer) are preferably calibrated in parallel. A trim or calibration value is provided to each temperature sensor 12 from a test unit. The temperature sensors detect the temperature and the resulting three bit status values are retrieved by the test unit from each status register 14 of the temperature sensors. The trim value and resulting status values are stored by the test unit external of the chips. The trim value is incremented by the test unit, where the above sequence is repeated numerous times (e.g., typically at least forty times) for each temperature sensor in order to identify the appropriate trim value for that temperature sensor. The number of sequence iterations performed is based on the quantity of temperature sensor trim or calibration values, and the quantity of temperature measurements needed to determine the appropriate trim values for the temperature sensors. These trim values may vary among the temperature sensors due to hardware fluctuations as described above.

After completion of the sequence iterations, the stored information (e.g., trim and status values) is analyzed by the test unit in a post-processing phase to determine the appropriate trim or calibration value for each temperature sensor. This is accomplished by identifying the trim value associated with the desired transition of the three bit status value for the reference temperature (e.g., the trim value associated with the status value change from five to four as viewed in FIG. 2). The identified trim values (e.g., seven bit code or value) are subsequently transferred to a fuse converter for burning or hard coding onto chips 2 in corresponding trim registers 16 (e.g., fuse registers, etc.). The resulting trim or calibration values stored in trim registers 16 are subsequently used by the corresponding temperature sensors.

The technique described above suffers from several disadvantages. In particular, the technique is time intensive and tends to produce inaccurate results. Further, since the temperature sensors are calibrated in parallel, the calibration sequence is repeated numerous times for each temperature sensor. Thus, the calibration may be performed for temperature sensors even after the appropriate calibration or trim value has been utilized in a prior iteration, thereby performing unnecessary calibration steps and increasing the time for the calibration. This further provides additional and unnecessary information for the post processing phase and wastes resources. Moreover, the processing for the calibration is performed external of the chip, thereby requiring additional tasks of transferring information between the chip and external test unit that further complicate and increase the time for the calibration. In addition, the above technique requires the test unit to perform or issue two commands or steps (e.g., provide a trim or calibration value and retrieve status bits) for each iteration. This utilizes substantial processing time of the test unit and complicates the procedure.

SUMMARY OF THE INVENTION

According to embodiments of the present invention, an apparatus calibrates a temperature sensor of a chip with respect to a target temperature, wherein the temperature sensor receives a calibration value and provides a status code indicating a measured temperature. The apparatus includes a calibration unit disposed on the chip to calibrate the temperature sensor. The calibration unit includes a counter and a compare unit. The counter provides the calibration value for the temperature sensor to perform a temperature measurement and increments the calibration value for successive temperature measurements. The compare unit retrieves the status code from the temperature sensor in response to a temperature measurement and compares the retrieved status code with a reference code associated with the target temperature to determine the calibration value providing a proper calibration for the temperature sensor. The compare unit further disables the counter in response to determining the proper calibration value. The embodiments of the present invention further include a method and a memory device for calibrating the temperature sensor as described above.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

The present invention embodiments pertain to automatic calibration of on-chip temperature sensors. A test unit may initiate this calibration for a temperature sensor on a chip and retrieve from the chip the resulting calibration value for the temperature sensor, thereby simplifying the calibration procedure and reducing the processing required by the test unit. In addition, the present invention embodiments reduce errors and the time required to perform the calibration.

Figure 3:
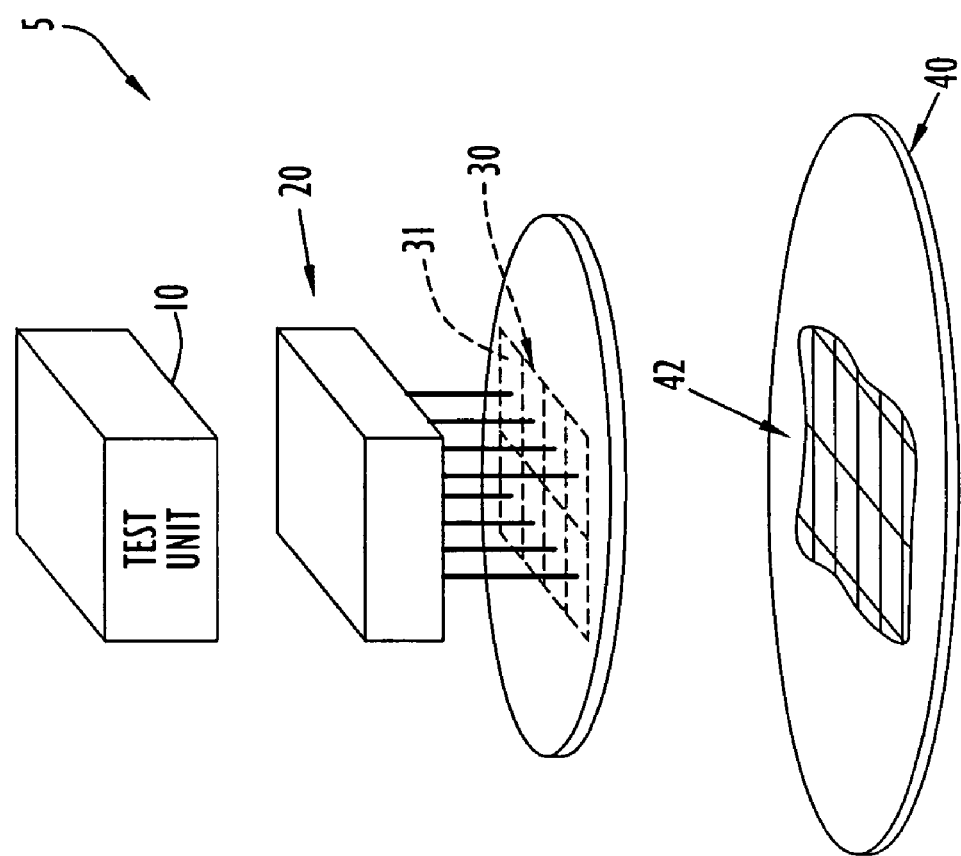
FIG. 3 is a diagrammatic illustration of an exemplary wafer test system that may be employed with the memory device of present invention.

An exemplary wafer test system that may be utilized with the present invention is illustrated in FIG. 3. In particular, wafer test system 5 includes a test unit 10, a connector 20 and a probe card 30. The wafer test system may be implemented by any conventional wafer testing system or components. Test unit 10 is programmable and includes a processor to generate test patterns, issue test mode commands and generally control testing. The test unit is coupled to probe card 30 via connector 20. The probe card includes a series of contact sets 31 for interfacing chips 42 on a wafer 40. By way of example only, chips 42 are Dynamic Random Access Memory (DRAM) type chips. However, the chips may be of any type (e.g., integrated circuits, logic, gates, etc.), while the probe card may include any suitable quantity of contact sets. The probe card enables transfer of signals between the chips and test unit 10.

Figure 4:
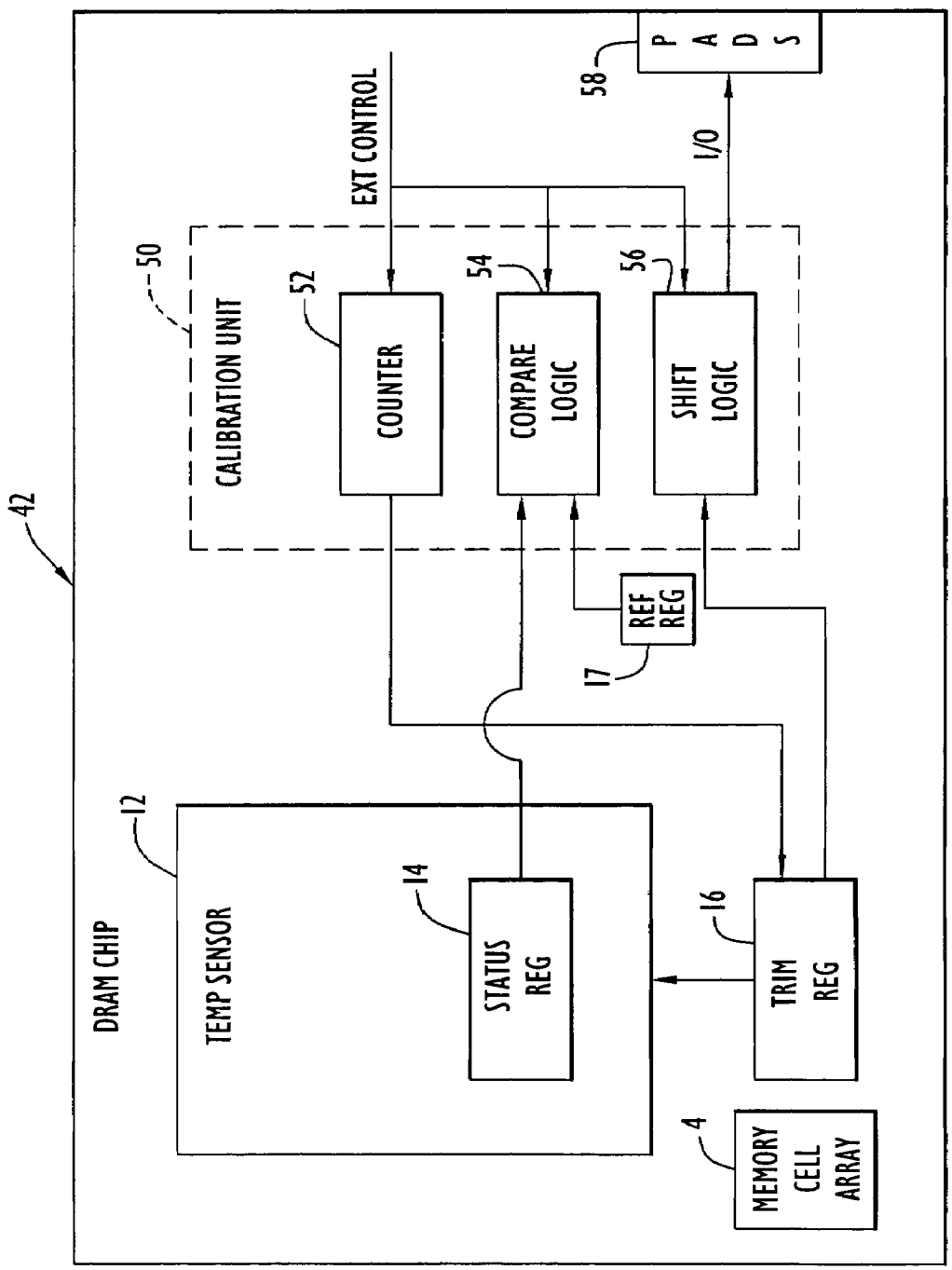
FIG. 4 is a schematic block diagram of an exemplary DRAM chip including a calibration unit according to an embodiment of the present invention.

An exemplary memory device or chip 42 performing the temperature sensor calibration according to an embodiment of the present invention is illustrated in FIG. 4. Specifically, memory device or chip 42 includes memory cell array 4, temperature sensor 12, a reference register 17, a trim or calibration register 18, a calibration unit 50 and pads or terminals 58. Memory cell array 4 stores information or data and is substantially similar to the memory cell array described above. The temperature sensor may be implemented by any conventional or other temperature sensing device and may measure any suitable temperature or temperature ranges. The temperature sensor includes status register 14 to provide status bits or a code indicating the temperature sensor status in response to a temperature measurement. The status code or value preferably includes three bits; however, the status value may include any quantity of bits for indicating any quantity of states. The status register may be implemented by any conventional or other register or storage device of any suitable storage capacity (e.g., any quantity of bits).

Trim register 18 stores the trim or calibration value for the temperature sensor as described below. The trim value preferably includes seven bits, but may include any quantity of bits for any desired values. The trim register may be implemented by any conventional or other register or storage device of any storage capacity (e.g., any quantity of bits), preferably with read/write access (or programmable) to update and/or store information. Pads 58 include various lines or terminals (e.g., address pads, data pads (DQ), etc.) enabling the memory device to transfer information (e.g., provide or receive information such as data, addresses, etc.) with external devices (e.g., processor, test unit, memory controller, etc.).

Figure 5:
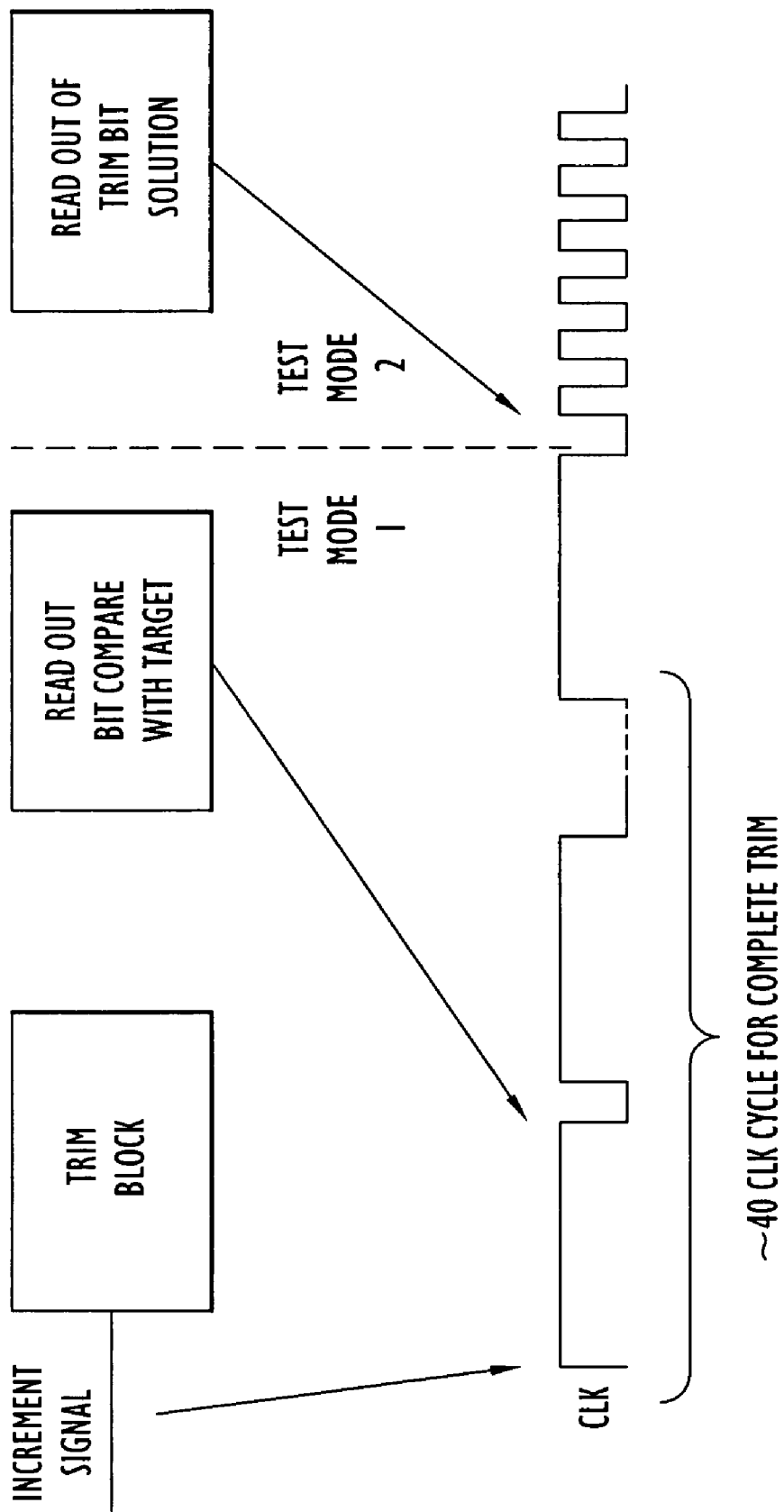
FIG. 5 is a graphical plot of exemplary control signals provided by a test unit for performance of the temperature sensor calibration.

Calibration unit 50 controls calibration of temperature sensor 12 in response to a control signal from test unit 10 (FIG. 3). The control signal is preferably in the form of a clock signal or pulse train as illustrated, by way of example only, in FIG. 5. The clock signal preferably includes approximately forty pulses to enable the calibration unit of each chip to determine the appropriate trim or calibration value for the temperature sensor of that chip as described below. The pulse width of each of these pulses is sufficient to enable a temperature sensor to produce a status value in response to receiving a trim or calibration value. However, the control signal may include any quantity of pulses of any desired pulse width. In particular, the calibration unit includes a counter 52, compare logic 54 and shift logic 56. These devices may be implemented by any quantity of any combination of hardware (e.g., logic, gates, processor, circuitry, etc.) and/or software modules (e.g., executing on a processor or other hardware module). Counter 52 may be implemented by any conventional or other counter and is preferably a seven bit counter that cycles through a range of values (e.g., 0 through +127 for a seven bit counter) serving as the trim or calibration value as described below. The counter may alternatively include any quantity of bits to cycle through any desired range of values. The counter is typically initialized to include an initial counter value (e.g., zero) and increments the counter value in response to the rising edge of each pulse within the externally provided clock signal (FIG. 5). The counter preferably increments the value by one, but any suitable increment may be employed. The counter value serves as a trim or calibration value and is stored in trim register 18 for conveyance to temperature sensor 12. The temperature sensor measures the temperature and produces the three bit status value within status register 14 as described above in response to receiving the trim value produced by counter 52.

The status value is retrieved from status register 14 by compare logic 54 in response to the falling edge of each pulse within the externally provided clock signal (FIG. 5). The pulse width of each clock signal pulse is sufficient to enable the temperature sensor to produce the status value as described above. In other words, the pulse width provides time sufficient for the temperature sensor to measure the temperature with the counter or trim value and settle to produce the status value. The compare logic may be implemented by any conventional or other comparing device (e.g., logic, gates, processor, comparator, decoder, etc.) and compares the resulting status value to a target or reference value stored within reference register 17. The reference register may be implemented by any conventional or other register or storage device, preferably with read/write access (or programmable) to update and/or store information. However, the reference value may alternatively be static or hard coded within the register.

Figure 2:
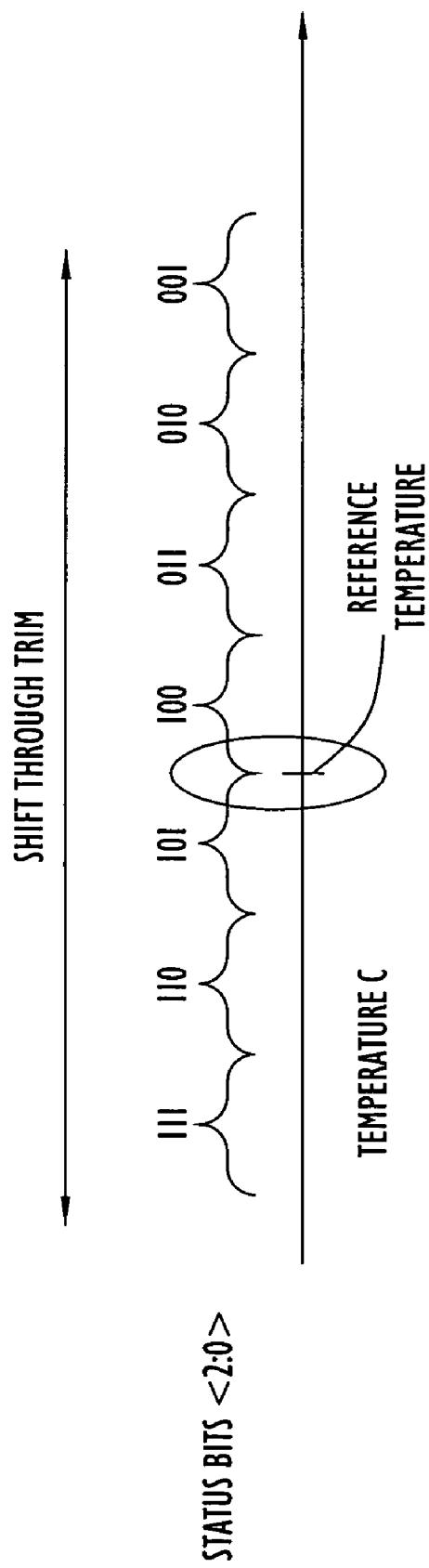
FIG. 2 is a graphical illustration of exemplary states of status bits produced by a temperature sensor of the memory device of FIG. 1.

The status value indicates a temperature measured by temperature sensor 12. Basically, the status bits change states or values in response to the measured temperature. For example, the temperature sensor status bits may include states or values one through seven (e.g., '001' to '111' as viewed in FIG. 2) each associated with a corresponding temperature or temperature range as described above. As the temperature increases, the status bits transition from state seven (e.g., status bit values of '111') toward state one (e.g., status bit values of '001') in accordance with the measured temperature. In other words, the status bits indicate the state corresponding to the temperature or temperature range encompassing the measured temperature. The reference or target value indicates the status value for a corresponding reference temperature. By way of example only, the reference temperature is in the approximate range of 85° C.-88° C. However, the reference temperature may be any desired temperature, where any quantity of states may be employed by the temperature sensor and associated with any desired temperatures or temperature ranges in any desired fashion (e.g., sequential, random order, etc.).

Since the status value produced by the temperature sensor changes with varying temperature, the appropriate trim or calibration value is identified when the corresponding status value equals the reference value. If the status value does not equal the target value as determined by compare logic 54, the counter remains enabled to increment the current trim or calibration value on the rising edge of the next pulse of the clock signal (FIG. 5) and the above procedure is repeated until an appropriate trim or calibration value is identified (e.g., a status value is produced that equals the target value). When the status value equals the target value, the resulting trim or calibration value associated with that status value serves as the appropriate trim or calibration value for temperature sensor 12. The compare logic produces signals to disable and reset counter 52, where the appropriate trim value is stored in trim register 18 for use by temperature sensor 12.

The test unit typically provides a clock signal with approximately forty pulses to enable each chip to identify the appropriate trim or calibration value for the corresponding temperature sensor as described above. The various chips may identify the appropriate trim values at different pulses of the clock signal; however, when an appropriate trim value is identified for a chip, the chip remains idle until completion of the clock signal pulses. Once the clock signal pulses are completed, shift logic 56 may retrieve the resulting trim value from trim register 18 for conveyance to the test unit. Shift logic 56 may be implemented by any conventional or other data transfer devices (e.g., logic, gates, processor, shift register, etc.) and provides the trim value on a pad 58 (e.g., DQ data pad) for transference to the test unit. A control signal (FIG. 5) is provided by the test unit in a second or subsequent test mode sequence to control shift logic 56 to provide data on the pad in a serial fashion. In particular, the test unit provides the control signal in a second test mode sequence with a pulse train (FIG. 5) including a pulse for each bit of the trim value (e.g., seven pulses for seven bits). Shift logic 56 provides a successive bit of the trim value on the pad with each pulse of the control signal. The test unit may retrieve the trim values from the pad in a serial fashion.

Figure 1:
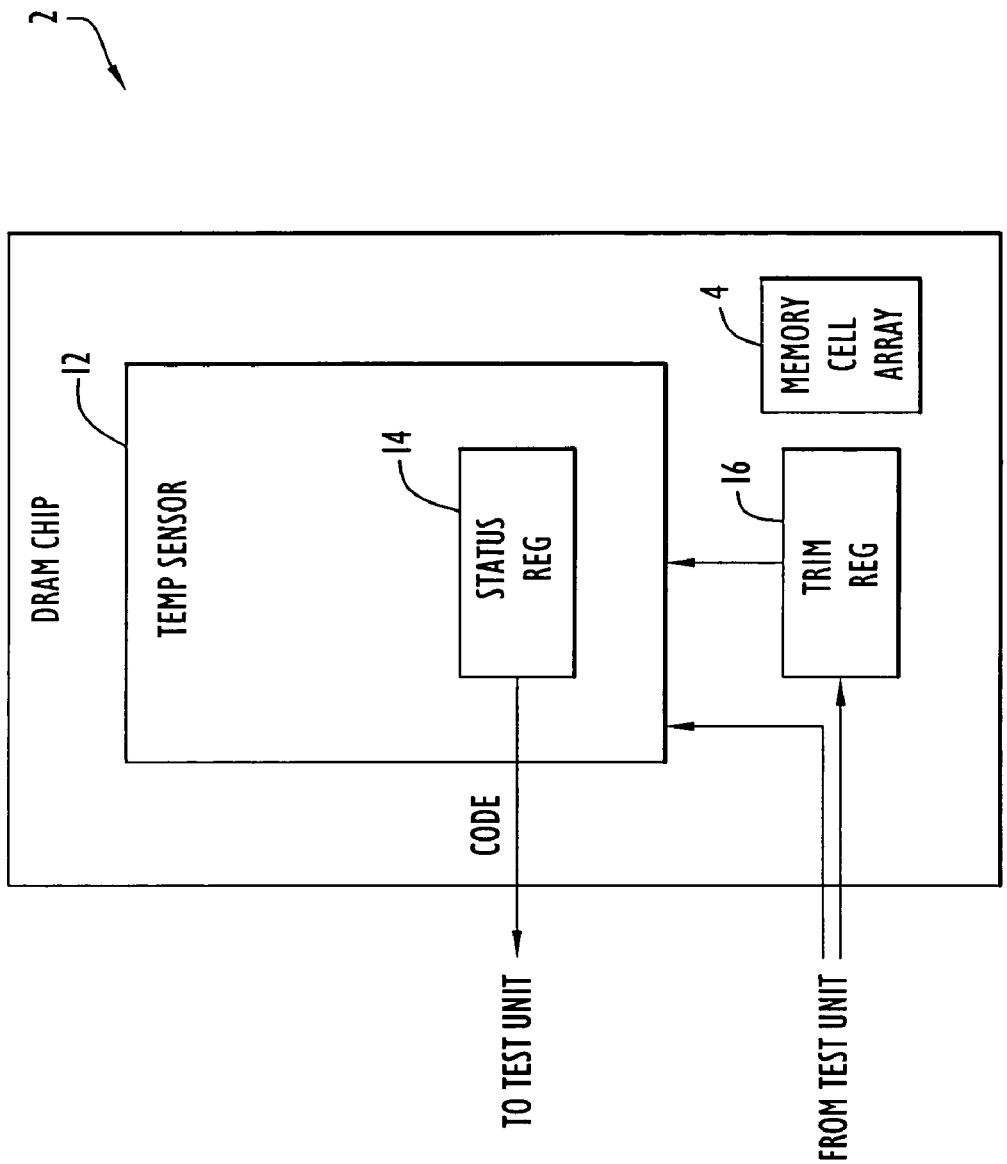
FIG. 1 is a block diagram of an exemplary Dynamic Random Access Memory (DRAM).
Figure 6:
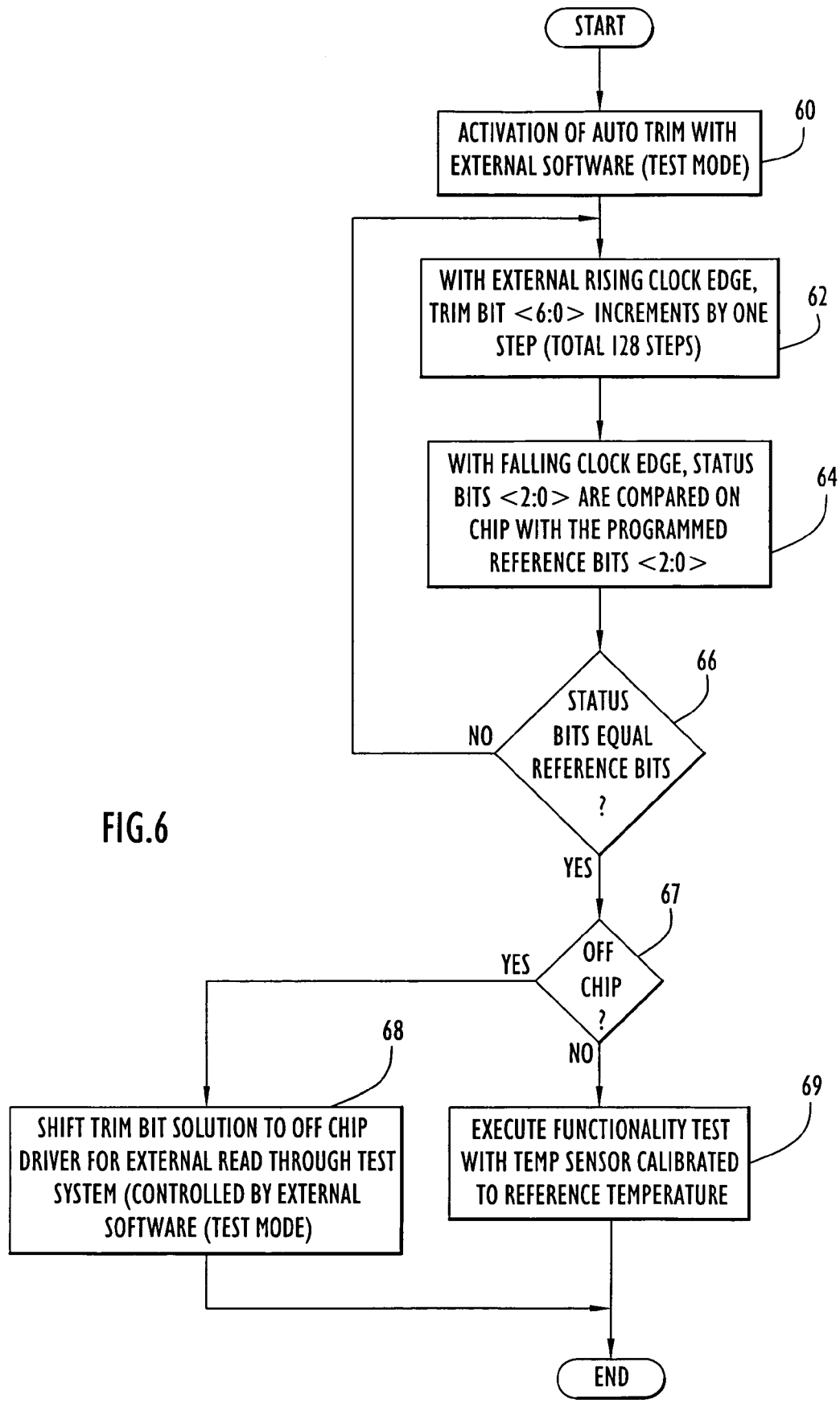
FIG. 6 is a procedural flow chart illustrating the manner in which a temperature sensor of a chip is calibrated according to an embodiment of the present invention.

The manner in which temperature sensor 12 is calibrated according to an embodiment of the present invention is illustrated in FIGS. 4-6. The calibration is typically performed in parallel for temperature sensors of several chips, where each temperature sensor is calibrated in substantially the same manner described below. Initially, test unit 10 (FIG. 1) initiates the calibration at step 60 via a first test mode sequence and provides the external control signal or clock (e.g., pulse train, etc.) with approximately forty pulses (FIG. 5) to calibration unit 50 as described above. Counter 52 is initialized and increments the counter value in response to the rising edge of a clock signal pulse (FIG. 5) at step 62. The counter value is stored in trim register 18 and is provided to temperature sensor 12 as the trim or calibration value. The temperature sensor measures the temperature with the trim value and produces the three bit status value in status register 14 as described above.

Compare logic 54 retrieves the resulting status value from status register 14 on the falling edge of the same clock pulse (FIG. 5) that incremented the counter and compares the status value to a reference value associated with a target temperature at step 64. If the status value does not equal the target value, the counter increments the current trim value on the rising edge of the next clock pulse and the above procedure (e.g., steps 62, 64) is repeated. When the resulting status value equals the reference value as determined at step 66, the appropriate trim value for the temperature sensor has been identified and is currently stored in trim register 18.

The clock signal includes a quantity of pulses sufficient for the calibration unit to identify the appropriate trim value for the temperature sensor as described above. When the chip identifies the appropriate trim value for the temperature sensor prior to completion of the pulses, the chip waits for completion of the pulse train. At the completion of the pulses from the first test mode sequence, the resulting trim value may be transferred to an off-chip or external device (e.g., test unit 10). If the resulting trim value is to be transferred off-chip as determined at step 67, the test unit enters a subsequent or second test mode sequence providing a control signal in the form of another pulse train (FIG. 5) to retrieve the trim value from the chip. In particular, shift logic 56 retrieves the trim value from trim register 18 and provides the trim value in a serial fashion to a chip data pad 58 at step 68. The shift logic provides the trim value to the pad in a serial fashion in accordance with pulses of the pulse train from the second test mode sequence of test unit 10 as described above. The test unit retrieves the resulting trim value from the pad.

If the trim value is to remain on-chip as determined at step 67, subsequent tests may be performed at step 69 with the trim value stored in trim register 18. Thus, the test unit need only initiate the calibration and retrieve the resulting values in one or more test mode sequences instead of repeatedly providing a sequence of commands, performing post-processing to identify proper trim values and storing identified trim values as described above for the related art.

It will be appreciated that the embodiments described above and illustrated in the drawings represent only a few of the many ways of implementing a method and apparatus for calibration of an on-chip temperature sensor within a memory device.

The present invention may be employed with any type of chip (e.g., integrated circuit, gates, etc.) or memory device (e.g., RAM, DRAM, ROM, DDR, dynamic, static, etc.). The memory device may include any quantity of any types of memory cell arrays with any desired storage capacities (e.g., kilobits, megabits, gigabits, etc.). The memory cell arrays may include any types of memory cells (e.g., transistors, capacitors, etc.). The chip may be arranged in any fashion and may be of any shape or size. The components (e.g., pads, memory cell arrays, calibration unit, counter, compare logic, shift logic, trim register, temperature sensor, etc.) may be arranged on the chip in any desired fashion and may be implemented by any conventional or other components (e.g., circuitry, chips, gates, logic, etc.) performing the functions described herein. The memory device may receive commands from any quantity of any type of external devices (e.g., processor, controller, test unit, etc.).

The test unit may be implemented by any quantity of any conventional or other test unit and may include any combination of software (e.g., programs, etc.) and/or hardware modules (e.g., processor, circuitry, etc.). Any quantity of test mode sequences may be employed to perform the temperature sensor calibration. The probe card may be implemented by any quantity of any conventional or other probe devices and include any quantity of contacts to couple with device pads. The pads may be of any quantity, may be arranged and disposed on the chip in any fashion (e.g., in any area) and may be implemented by any conventional or other pads (e.g., contacts, terminals, etc.). The pads may be utilized to transfer any desired information (e.g., data, commands, addresses, control signals, pulses, etc.). The control signal from the test unit may be in any desired form (e.g., pulses, etc.), may be issued from any desired test mode or other sequence and may include any desired characteristics (e.g., frequency/period, pulse width, voltage level, etc.). The control signal may be transferred to the chip via any quantity of pads or other contacts and may include any quantity of pulses to perform the calibration and/or access the trim values from the chips. The chips may be calibrated individually, or a plurality of chips may be calibrated in parallel.

The temperature sensor may be implemented by any conventional or other temperature sensing device and may measure any suitable temperature or temperature ranges. The status code or value may be of any desired values and include any quantity of bits for indicating any quantity of states. The status register may be implemented by any quantity of any conventional or other register or storage device of any suitable storage capacity (e.g., any quantity of bits). Any quantity of states may be employed by the temperature sensor and associated with any desired temperatures or temperature ranges in any desired fashion (e.g., sequential, random order, etc.).

The trim value may include any quantity of bits for any desired values. The trim register may be implemented by any conventional or other register or storage device of any storage capacity (e.g., any quantity of bits), preferably with read/write access (or programmable) to update and/or store information. The reference register may be implemented by any quantity of any conventional or other register or storage device, preferably with read/write access (or programmable) to update and/or store information. The reference value may alternatively be static or hard coded within the register. Further, the present invention may be utilized with any suitable reference temperature to calibrate the temperature sensor, where different reference temperatures may be employed for different chips for individual chip calibration.

The calibration unit may be implemented by any quantity of any combination of hardware (e.g., logic, gates, processor, circuitry, etc.) and/or software modules (e.g., executing on a processor or other hardware module). The counter may be implemented by any quantity of any conventional or other counting device (e.g., counter, timer, ALU, processor, etc.) and may include any quantity of bits to cycle through any desired range of values. The counter may be initialized to any suitable value (e.g., zero, one, etc.) and may employ any suitable increment (e.g., one, two, etc.). The counter may be enabled by any portion of a pulse or clock signal.

The compare logic may be implemented by any quantity of any conventional or other comparing device (e.g., logic, gates, processor, comparator, decoder, etc.) and may compare the resulting status value to a target or reference value in accordance with any desired criteria (e.g., equal to, less than, greater than, etc.). The compare logic may provide any suitable signals (e.g., low or high pulses, etc.) to indicate results of the comparison. The compare logic may be enabled by any portion of a pulse or clock signal.

The shift logic may be implemented by any quantity of any conventional or other data transfer devices (e.g., logic, gates, processor, shift register, etc.) and may provide the trim value to any quantity of pads in any fashion (e.g., serial, parallel, etc.). The shift logic may transfer any quantity of bits based on any portions of a pulse or clock signal.

The present invention is not limited to the applications, temperature ranges or specific timing diagram described above, but may be applied to any types of memory or other devices where calibration of an on-chip temperature sensor with respect to a reference temperature is desirable. Further, the periods and states illustrated in the diagrams are exemplary, where the operation of the present invention may include any desired periods and states.

It is to be understood that the terms "top", "bottom", "front", "rear", "side", "height", "length", "width", "upper", "lower" and the like are used herein merely to describe points of reference and do not limit the present invention to any particular orientation or configuration. Further, the names or labels for the various signals or states used herein are merely exemplary and utilized for identification to reference the signals and states of the present invention. These signals and states may be utilized or associated with any names or labels.

From the foregoing description, it will be appreciated that the invention makes available a method and apparatus for calibration of an on-chip temperature sensor within a memory device, wherein an automatic trim or calibration for a temperature sensor of a chip or memory device is performed on that chip.

Having described preferred embodiments of a new and improved method and apparatus for calibration of an on-chip temperature sensor within a memory device, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An apparatus to calibrate a temperature sensor of a chip with respect to a target temperature, wherein said temperature sensor receives a calibration value to perform a temperature measurement and produces a status code indicating a measured temperature, said apparatus comprising:
 a calibration unit disposed on said chip to calibrate said temperature sensor, wherein said calibration unit includes:
  a counter to provide said calibration value for said temperature sensor to perform a temperature measurement, wherein said counter increments said calibration value for successive temperature measurements;
  a compare unit to retrieve said status code produced by said temperature sensor in response to a temperature measurement and to compare said retrieved status code with a reference code associated with said target temperature to determine said calibration value providing a proper calibration for said temperature sensor, wherein said compare unit disables said counter in response to determining said proper calibration value.

2. The apparatus of claim 1, wherein said chip includes a series of pads to transfer information and said calibration unit further includes:
 a shift unit to selectively provide said proper calibration value to at least one of said pads for transfer from said chip to an external device.

3. The apparatus of claim 1, wherein said compare unit determines said proper calibration value in response to said comparison indicating said retrieved status code equals said reference code associated with said target temperature.

4. The apparatus of claim 1 further including:
 a calibration register to store said calibration value for said temperature sensor; and
 a reference register to store said reference code associated with said target temperature.

5. The apparatus of claim 1, wherein said chip includes a dynamic random access memory.

6. An apparatus to calibrate a temperature sensor of a chip with respect to a target temperature, wherein said temperature sensor receives a calibration value to perform a temperature measurement and produces a status code indicating a measured temperature, said apparatus comprising:
 calibration means disposed on said chip to calibrate said temperature sensor, wherein said calibration means includes:
  counting means for providing said calibration value for said temperature sensor to perform a temperature measurement, wherein said counting means increments said calibration value for successive temperature measurements;
  compare means for retrieving said status code produced by said temperature sensor in response to a temperature measurement and comparing said retrieved status code with a reference code associated with said target temperature to determine said calibration value providing a proper calibration for said temperature sensor, wherein said compare means disables said counting means in response to determining said proper calibration value.

7. The apparatus of claim 6, wherein said chip includes a series of pads to transfer information, and said calibration means further includes:
 shift means for selectively providing said proper calibration value to at least one of said pads for transfer from said chip to an external device.

8. The apparatus of claim 6, wherein said compare means determines said proper calibration value in response to said comparison indicating said retrieved status code equals said reference code associated with said target temperature.

9. The apparatus of claim 6 further including:
 calibration storage means for storing said calibration value for said temperature sensor; and
 reference storage means for storing said reference code associated with said target temperature.

10. The apparatus of claim 6, wherein said chip includes a dynamic random access memory.

11. A memory device comprising:
 a plurality of memory cell arrays;
 a plurality of pads to transfer information;
 a temperature sensor that receives a calibration value to perform a temperature measurement and produces a status code indicating a measured temperature; and
 a calibration unit to provide said calibration value for said temperature sensor to perform said temperature measurement and to compare a resulting status code produced by said temperature sensor in response to said temperature measurement with a reference code associated with a target temperature to determine said calibration value providing a proper calibration for said temperature sensor.

12. The memory device claim 11 further including:
 a calibration register to store said calibration value for said temperature sensor; and
 a reference register to store said reference code associated with said target temperature.

13. The memory device of claim 11, wherein said calibration unit includes:
 a counter to provide said calibration value for said temperature sensor to perform said temperature measurement, wherein said counter increments said calibration value for successive temperature measurements; and
 a compare unit to retrieve said status code from said temperature sensor in response to said temperature measurement and to compare said retrieved status code with said reference code associated with said target temperature to determine said calibration value providing a proper calibration for said temperature sensor, wherein said compare unit disables said counter in response to determining said proper calibration value.

14. The memory device of claim 13, wherein said chip includes a series of pads to transfer information, and said calibration unit further includes:
 a shift unit to selectively provide said proper calibration value to at least one of said pads for transfer from said chip to an external device.

15. The memory device of claim 13, wherein said compare unit determines said proper calibration value in response to said comparison indicating said retrieved status code equals said reference code associated with said target temperature.

16. A method of calibrating a temperature sensor of a chip with respect to a target temperature, wherein said temperature sensor receives a calibration value to perform a temperature measurement and produces a status code indicating a measured temperature, said method performed on said chip and comprising:
  (a) determining said calibration value for said temperature sensor to perform a temperature measurement and incrementing said calibration value for successive temperature measurements;
  (b) retrieving said status code produced by said temperature sensor in response to each temperature measurement and comparing said retrieved status code with a reference code associated with said target temperature to determine said calibration value providing a proper calibration for said temperature sensor; and
  (c) disabling said incrementing of said calibration value in response to determining said proper calibration value.

17. The method of claim 16, wherein said chip includes a series of pads to transfer information, and said method further includes:
  (d) selectively providing said proper calibration value to at least one of said pads for transfer from said chip to an external device.

18. The method of claim 16, wherein step (b) further includes:
  (b.1) determining said proper calibration value in response to said comparison indicating said retrieved status code equals said reference code associated with said target temperature.

19. The method of claim 16, wherein step (a) further includes:
  (a.1) storing said calibration value for said temperature sensor in a calibration register; and
  (a.2) storing said reference code associated with said target temperature in a reference register.

20. The method of claim 16, wherein said chip includes a dynamic random access memory.

* * * * *